Oct. 12, 1926.
A. J. VILLENEUVE
1,603,223
GRIPPER BAR FOR PRINTING PRESSES
Filed Feb. 13, 1926
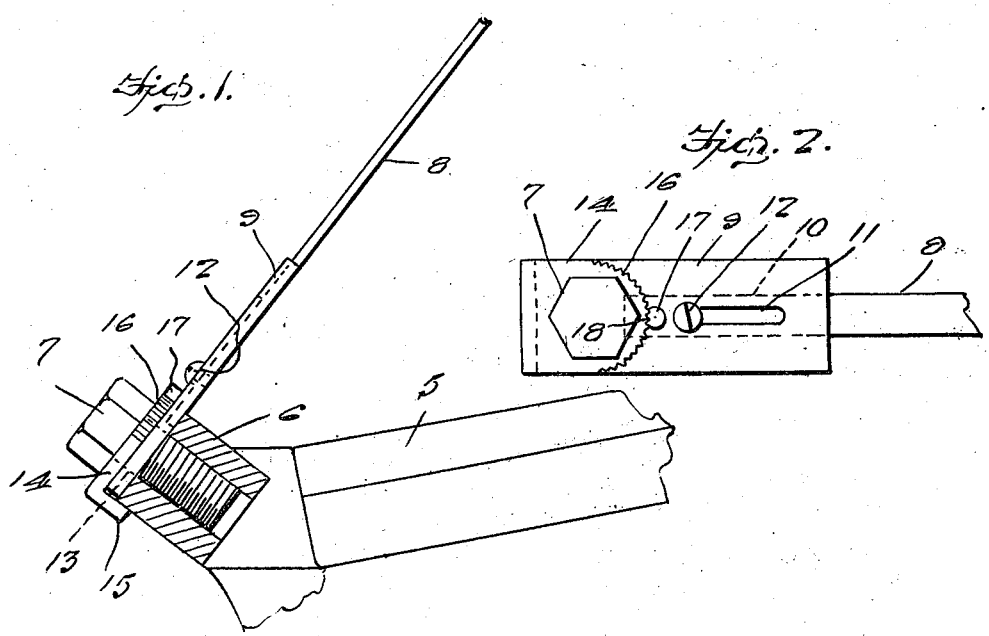
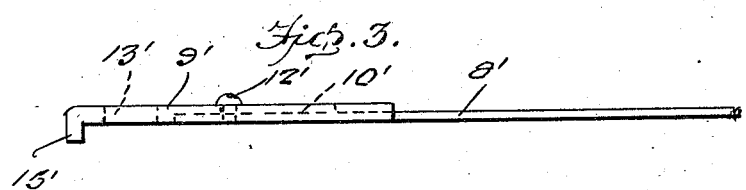
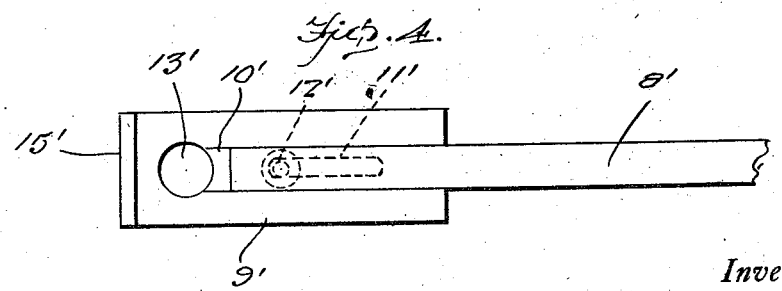
Inventor
A. J. Villeneuve
By Clarence A. O'Brien
Attorney Patented Oct. 12, 1926.

1,603,223

UNITED STATES PATENT OFFICE.

ALBERT J. VILLENEUVE, OF ISHPEMING, MICHIGAN.

GRIPPER BAR FOR PRINTING PRESSES.

Application filed February 13, 1926. Serial No. 88,058.

The present invention relates to an improved gripper bar for use on platen printing presses, and has for its principal object to provide an adjustable structure capable of allowing the gripper bar to be adjusted or swung in relation to the gripper holder so as to extend at various angles therefrom and also permits the gripper bar to be lengthened or shortened as may be desired.

Another very important object of the invention is the provision of a gripper bar of this nature which is exceedingly simple in its construction, easy to manipulate in its various adjustments, not likely to easily become out of order, strong, durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a sectional view through a gripper holder showing one of my improved gripper bars, Fig. 2 is a plan view of the gripper bar, Fig. 3 is an edge view of a modification of the gripper bar, and Fig. 4 is a bottom plan view of said modification.

Referring to the drawing in detail, it will be seen that 5 designates a platen having the usual gripper holder 6 mounted thereon with a plurality of screws 7 engageable therewith for holding the gripper bars in place. I have just illustrated the mounting of a single gripper bar, as this will suffice for the purposes of the present invention, wherein the improvement lies in the gripper bar per se.

Referring to the embodiment of the gripper bar as is illustrated in Figs. 1 and 2, it will be seen that 8 designates an elongated shank forming the gripper bar proper, and 9 designates a plate which is provided on its surface with an elongated longitudinally extending groove 10, and a similarly extending slot 11. The shank 8 is slidably receivable in the groove 10 and a screw 12 pierces the slot 11 and engages the shank 8 so that the shank 8 may be held in different adjusted position in relation to the plate 9 for lengthening and shortening the gripper bar.

The plate 9 is provided with an aperture or opening 13. A washer 14 is provided with a flange 15 for engaging a side of the gripper holder to prevent the turning of this washer when the screw 7 is engaged therethru. The screw 7 also extends through the aperture 13. One edge of the washer 14 is arcuate and provided with a series of teeth 16. A stud 17 rises from the plate 9 and is provided with teeth 18 engageable with teeth 16. By loosening the screw 7 and raising the washer 14 to disengage its teeth 16 with the teeth 18 of the stud 17 it will be seen that the plate 9 may be swung to the desired angle in relation to the gripper holder 6, and when the screw 7 is tightened, the teeth 16 of the washer 14 will engage the teeth 18 of the stud 17 thereby locking the plate 9 in the adjusted position.

Referring now particularly to the embodiment shown in Figs. 3 and 4, it will be seen that a plate 9' is provided with a flange 15' at one end for engaging the gripper holder in a similar manner to the flange 15 of the washer 14. The plate 9' is provided with an opening 13' adjacent the flanged end 15', and on its under surface is provided with an elongated longitudinally extended groove 10' for receiving the shank 8'. The plate 9' is further provided with an elongated slot 11' so that a screw 12' may be passed therethrough and engaged in the shank 8' for holding said shank 8' in different position in relation to the plate 9'.

The opening 13' is adapted to receive the screw 7. The similarity between the embodiments will be apparent hereinafter.

It is thought that the construction, operation, and advantages of this invention will now be clearly understood without a more detailed description thereof. The present embodiment of the invention has been disclosed in detail, since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

A gripper bar of the class described including an oblong plate provided on its under surface with an elongated longitudinally extending groove arranged along the median longitudinal dimension of the plate and a slot coincident with a portion of said groove and extending longitudinally therewith, a shank forming the gripper bar proper longitudinally slidable in the groove, a screw piercing the slot and engaged with the shank for holding said shank in different adjusted positions in longitudinal relation to said plate, said plate being provided with an opening for receiving the screw of a gripper holder.

In testimony whereof I affix my signature.

ALBERT J. VILLENEUVE.